United States Patent [19]

Hirasawa et al.

[11] Patent Number: 4,975,724
[45] Date of Patent: Dec. 4, 1990

[54] LENS POSITION CONTROL DEVICE

[75] Inventors: Masahide Hirasawa; Hiroyuki Wada; Naoya Kaneda; Hirofumi Suda, all of Kanagawa, Japan

[73] Assignee: Canon Kabushiki Kaisha, Tokyo, Japan

[21] Appl. No.: 340,025

[22] Filed: Apr. 18, 1989

[30] Foreign Application Priority Data

Apr. 28, 1988 [JP] Japan .................................. 63-107314

[51] Int. Cl.⁵ ............................................. G03B 13/36
[52] U.S. Cl. .................................... 354/400; 354/195.1
[58] Field of Search .................. 354/400, 195.1, 195.12

[56] References Cited

U.S. PATENT DOCUMENTS

| 4,693,581 | 9/1987 | Yamaki et al. | 354/400 |
| 4,748,509 | 5/1988 | Otake et al. | 354/400 |
| 4,841,325 | 6/1989 | Hoshino | 354/400 |

FOREIGN PATENT DOCUMENTS

1-19121  4/1989  Japan .

Primary Examiner—Russell E. Adams
Attorney, Agent, or Firm—Fitzpatrick, Cella, Harper & Scinto

[57] ABSTRACT

A lens position control device for an optical instrument, the instrument including a variator and a compensator, the latter of which also serves as a focusing lens, comprises a detecting circuit for detecting the positions of the variator and the focusing lens, a memory for storing information representing the location and size of an impossible-to-focus zone for the focusing lens as the function of the zooming position of the variator, and a control circuit responsive to detection of the fact that the focusing lens falls in the impossible-to-focus zone on the basis of the information stored in the memory for causing the focusing lens to retire from the impossible-to-focus zone or for prohibiting the focusing lens from further moving in a direction toward the impossible-to-focus zone.

18 Claims, 11 Drawing Sheets

B   POSITION OF LENS GROUP
    FOR FOCUS ADJUSTMENT

LENS POSITION CONTROL DEVICE

Background of the Invention

1. Field of the Invention:

This invention relates to lens position control devices for use in cameras, video cameras, etc.

Figure 6:
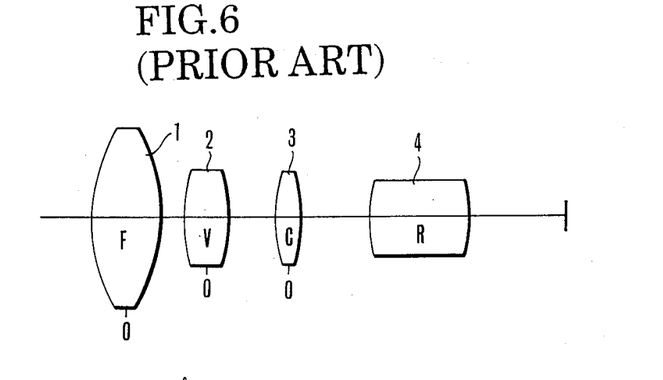
FIG. 6 is a block diagram for explaining an example of a conventional technique.

2. Description of the Related Art:

A photographic lens having a magnification varying function for a video camera has, in most cases, been constructed as shown in FIG. 6.

Figure 7:
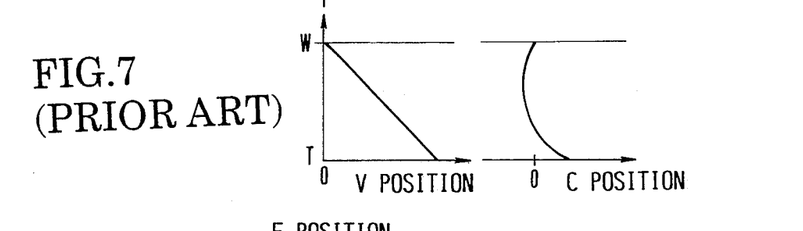
FIG. 7 comprises two graphs for explaining one of the features of the lens system of FIG. 6.

In FIG. 6, reference numeral 1 denotes a lens group (F) for focus adjustment; 2 denotes a lens group (V: variator) for varying the image magnification; 3 denotes a lens group (C: compensator) for bringing the sharply focused object to the right place when varying the image magnification; and 4 denotes a lens group (R: relay) for forming an image. Of these, the lens group 2 and the lens group 3, as shown in FIG. 7, have to the shortest focal length (wide-angle end). When zooming is performed, lens groups 2 and 3 move in differential relation between the wide-angle end (W) and the longest focal length position (telephoto end: T).

Figure 8:
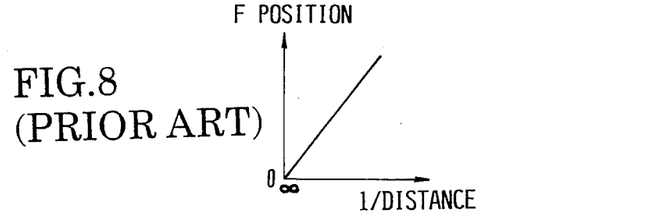
FIG. 8 is a graph for explaining another feature of the same lens system.

Meanwhile, when focus adjustment (focusing) is performed, the axial position of lens group 1 is varied by moving it forward as the object distance shortens, as shown in FIG. 8. In this connection, it should be pointed out that, because the "F position" (the position of the lens group 1) and "1/distance" are in proportional relation, in order that the minimum object distance is reduced, the total focusing movement must rapidly be increased, becoming infinite when focusing on an object at a distance of 0 cm.

Figure 9:
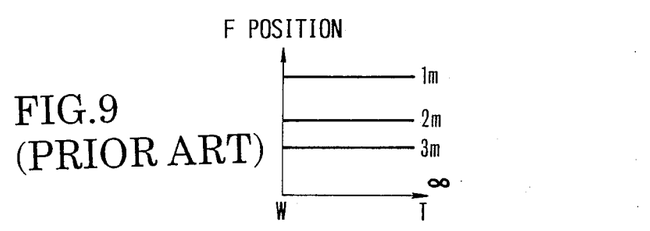
FIG. 9 is a graph for explaining still another feature of the same lens system.

FIG. 9 shows the variation of the total focusing movement (F position) of the lens group 1 with variation of the focal length of the entire system where the ordinate is the F position and the abscissa is the focal length with the object distance as a parameter taking representative values of ∞, 3 m, 2 m and 1 m. As is evident from FIG. 9 in the conventional lens system, so long as the object distance does not change, even if the focal length is changed by zooming, there is no need to re-adjust the position of the lens group 1. In other words, that lens group which partakes in focus adjustment and that set of lens groups which partakes in focal length adjustment are altogether independent of each other.

Figure 10:
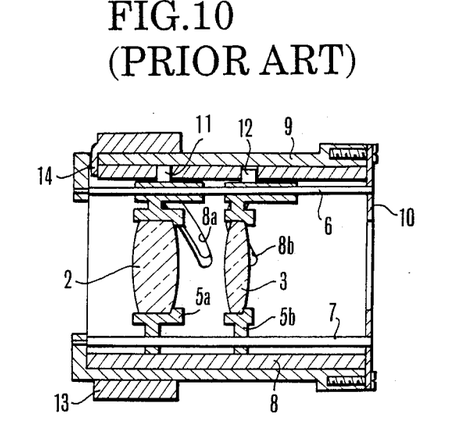
FIG. 10 is a sectional view for explaining another example of the conventional technique.

FIG. 10 shows particularly that part of the conventional mechanical mounting for this lens which constitutes the interlocking mechanism for both the lens group 2 as the variator and the lens group 3 as the compensator. A holder 5a containing the lens group 2 and another holder 5b containing the lens group 3 are movable as guided by a pair of bars 6 and 7, while their positions are defined by a cam sleeve 8 having camming slots 8a and 8b in cooperation with pins 11 and 12 fitted therein, thus realizing the as-designed accuracy of position control. The zooming operation is realized by rotating a zoom ring 13 which is operatively connected through an interlocking member 14 to the cam sleeve 8 so as to rotate the cam sleeve 8.

Such a conventional type of zoom lens for a video camera has its close-up capability practically limited to 1 m or thereabout as the minimum object distance, as has been described above, and is not suited to, closer focusing.

So, to solve this problem and still to simplify the structure of the operating mechanism, instead of using the lens group 1 (F) in focusing, another lens group may be moved as is known in the art.

Figure 11:
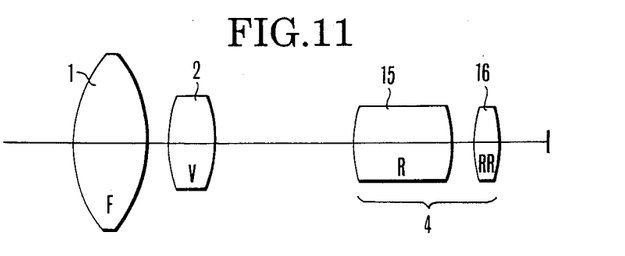
FIG. 11 is a block diagram of a lens system of the type suited to the invention.

FIG. 11 exemplifies that as the other lens group, the relay lens is moved in part. In this example, the first and third lens groups 1 and 15 (R) are fixed, and the second lens group 2 (V) as the variator changes its axial position with focal length adjustment as in FIG. 6. A fourth lens group 16 (RR) constituting part of a relay lens 4 has both roles of compensation and focus adjustment.

Figure 12:
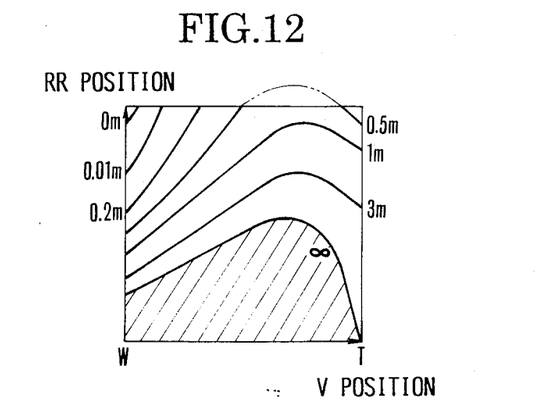
FIG. 12 is a graph for explaining the relationship of the positions of the lens groups of FIG. 11.

FIG. 12 shows the operation of this lens system where the abscissa is the position of the lens group 2 (V) and the ordinate is the position of the lens group 16 (RR). As is understandable by comparing it with FIG. 9, the use of a lens unit as shown in FIG. 11 leads to the necessity of changing the position of the lens group 16 (RR) both when changing the focal length and when the object distance changes. For this reason, in the lens unit shown in FIG. 11, the two movable lens groups are very difficult to control with a mechanical control device which is in such as shown in FIG. 10, or rather nearly impossible. Therefore, this type of lens unit has found little use in actual practice, though it has the advantage of shortening the minimum object distance.

But, in recent years, the technology of automatic focus adjusting devices has advanced, making it possible to detect whether or not an image is formed sharp on the image plane. It also becomes possible to control the position of the lens so as to bring the image into sharp focus.

FIG. 13, FIGS. 14(A) to 14(E) and FIG. 15 show an example of the automatic focus adjusting device.

Figure 13:
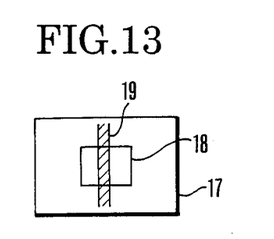
FIG. 13 is a plan view for explaining an automatic focus adjusting system suited to the invention.

In FIG. 13, the video camera has a picture 17 in which there is an area 18 for measuring the object distance. Also, an object to be photographed is assumed to have a contrast 19.

Figure 14A:
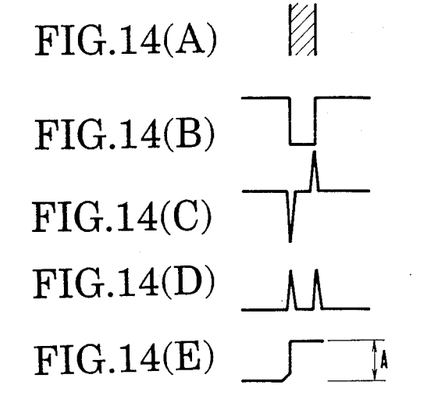

Suppose that part of the object which has the aforesaid contrast is imaged as shown in FIG. 14(A), then the device produces a Y signal output shown in FIG. 14(B). FIG. 14(C) represents the differentiated value of the Y signal, FIG. 14(D) its absolute value, and FIG. 14(E) a signal obtained by peak holding, where the height A indicates the degree of focus.

Figure 15:
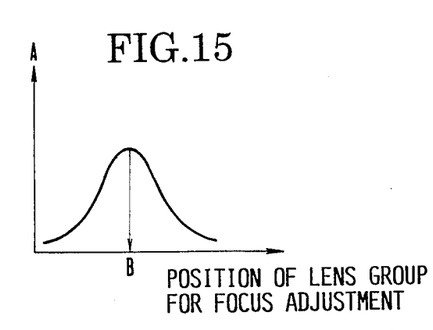
FIG. 15 is a graph for explaining the operational principle of the automatic focus adjusting system.

FIG. 15 is a graph showing the variation of the degree of focus A in the ordinate, as focus lens group 1 (F) of FIG. 6 or the lens group 16 (RR) of FIG. 11, varies its axial position in the abscissa. When the degree of focus takes a peak value, a sharp focus is established at the position B.

Figure 16:
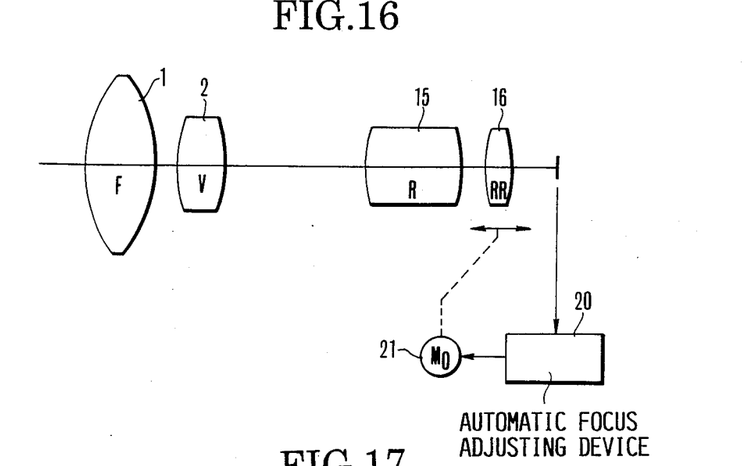
FIG. 16 is a schematic diagram of the lens system in combination with the automatic focus adjusting device.

Thus, even the lens system shown in FIG. 11 has the possibility of realizing a focusing capability when the principle explained in connection with FIG. 15 is put into practice by providing an automatic focus adjusting device 20 and an electric motor 21 for driving the lens group, as shown in FIG. 16.

If the feedback accuracy and quickness of the automatic focus adjusting device 20 shown in FIG. 16 are perfect, the picture will be obtained without any problem at all. However, in reality, the automatic focus adjusting device 20, because of its operating in cycles of distance measurement, has a delay in response, giving rise to the problem that defocus may occur.

In particular, in the case of changing object distances, since even the type of lens shown in FIG. 6 has never been freed from the possibility of setting the lens out of focus depending on the speed of movement of the object, the new type of lens unit may be equivalent to the old one. However, it is during zooming that if the automatic focus adjusting device 20 delays feedback a focusing defect of the sort never seen in the prior art is caused to appear. This constitutes a problem.

So, to solve the above-described problem, a proposal has been made in Japanese Laid-Open Pat. application No. Sho 62-296110, where, based on the position information of the first lens as the variator and the second lens as the compensator which also has the focusing function and the defocusing information, in which direction and at what speed the second lens is to be moved are derived from memory means, so that the movement of the second lens to the compensated position is started in earlier response to movement of the first lens. Another concept of the same kind is proposed in Japanese Laid-Open Pat. application No. Sho 62-284316. The common technique in both proposals is that the position information of at least the variator lens as the first lens is detected as the absolute position information, and still, as another position information, the absolute position information of the compensator-cum-focusing lens as the second lens is detected. Based on these two pieces of position information, data is chosen from the memory means so that the movement of the second lens is controlled.

By the way, in FIG. 12, the locus of the RR lens for an infinitely distant object lies one-sidedly of any other loci. Beyond the locus for $\infty$, there is an impossible-to-focus zone in which focusing can never be effected to suit any object distance, that is, a so-called inhibiting zone for the RR lens. (After the lens has once entered into this zone, as exceeding the terminal end for infinity of the focusing movement, it is no longer focusable.) When the running RR lens strays into this zone, the image is largely blurred. And it gets harder to quickly correct the focusing direction and bring the image into focus again. If the boundary of this inhibiting zone is a straight line perpendicular to the axis for the movement of the RR lens of FIG. 12, it would be possible to use a mechanical stopper. In fact, however, this inhibiting zone for every position of the variator is distributes like the zone C of FIG. 5, or the hatched zone of FIG. 12. Therefore, the size of the inhibiting zone for the RR lens must be altered as the function of the focal length of the entire system. Up to now, however, the difficult problem of preventing the RR lens from accidentally entering into the inhibiting zone has been left unsolved.

Summary of the Invention

One aspect of this invention is to control, for focusing purposes, the position of a lens group which performs not only focusing but also serves to compensate for the image shift when zooming. The lens position control device of the invention is characterized in that if it happens that the lens group finds its position in an impossible-to-focus zone on the infinite side, it is forcibly moved toward the focusable range.

One aspect of this invention is to control the focusing movement of a lens group which also serves to compensate for the image shift when zooming. The lens position control device of the invention is characterized in that if it happens that the lens group is about to enter into the impossible-to-focus zone on the infinite side, the lens is prohibited from further moving toward the impossible-to-focus zone.

Brief Description of the Drawings

FIGS. 14(A), 14(B), 14(C), 14(D) and 14(E) are wave forms illustrating a manner in which the automatic focus adjusting system operates.

Detailed Description of the Preferred Embodiments

Figure 1A:
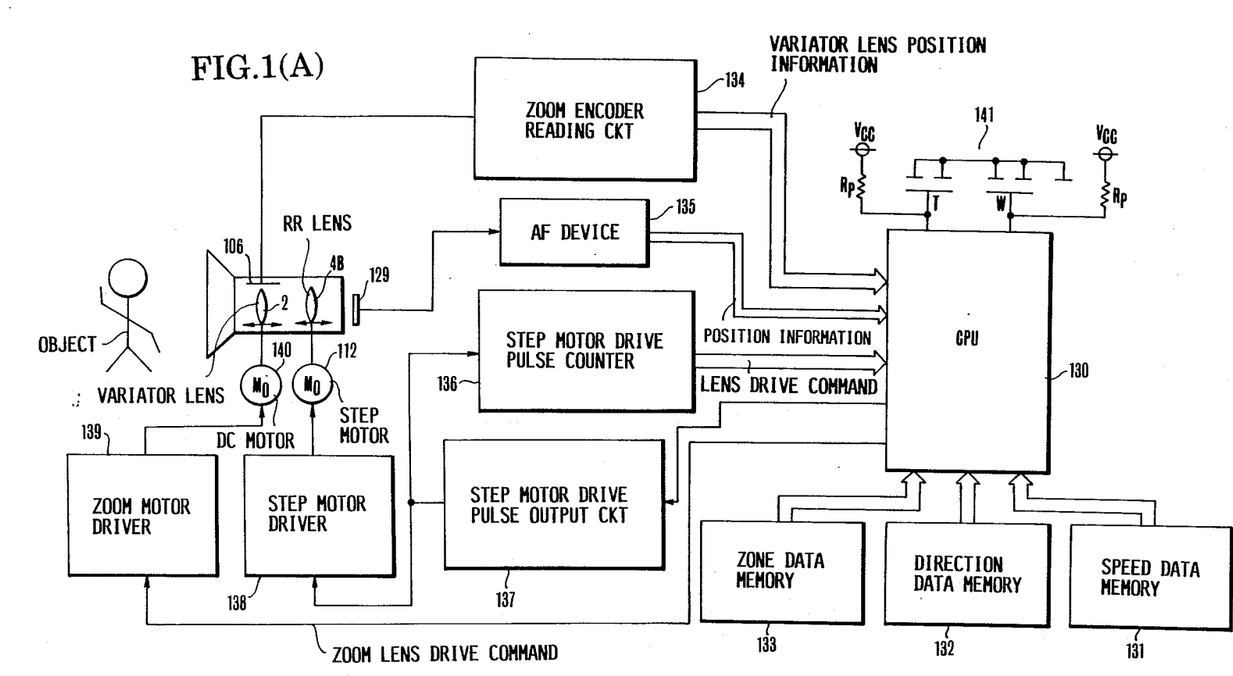
FIG. 1(A) is an electrical circuit diagram of a general embodiment of the invention.

FIG. 1(A) shows the circuitry of a lens position control device as a general embodiment of the present invention.

Reference numeral 141 denotes a zoom actuation detecting section in the form of switches (T, W) connected to a central processing unit (CPU) 130. When either one of the zoom switches (T, W) is operated, a trigger signal is formed. Responsive to this trigger signal, the CPU 130 determines the position of the lens group 2 (hereinafter called the "variator lens") sensed by an encoder 106 comprising a brush and a substrate in cooperation with a zoom encoder reading circuit 134. Also, the number of pulses the present position of a step motor 112 is in advance from an initial or reset position is counted by a step motor drive pulse counter 136, whose output is supplied to the CPU 130. From the comparison of these two pieces of lens position information with numerical values in a zone data memory 133, a determination of a zone is made. Then, a typical speed of the found zone for the lens group 4B (RR lens) for focusing (which functions as the compensator when zooming is read from a speed data memory 131. Further, depending on the history of the momentary positions of the zoom switches (T, W) of the zoom actuation detecting section 141, namely, from the wide-angle side to the telephoto side, or from the telephoto side to the wide-angle side, the direction in which the step motor 112 is to rotate is read from a direction data memory 132 into the CPU 130. In the CPU 130, the read contents from these data memories are combined with defocus information read from an AF (Auto-Focus) device 135 which can discriminate between focus states by information of an AF sensor 129 in order to determine the direction and speed in which the step motor 112 for driving the lens group 4B is to rotate. At the same time, depending on the actuation result of the zoom switches (T, W), the CPU 130 determines the direction in which a motor 140 for driving the variator lens 2 is to rotate. After that, the CPU 130 produces an output to a step motor drive pulse output circuit 137 and another output to a zoom motor driver 139 in such a manner that the two motors 140 and 112 rotate almost simultaneously.

Figure 1B:
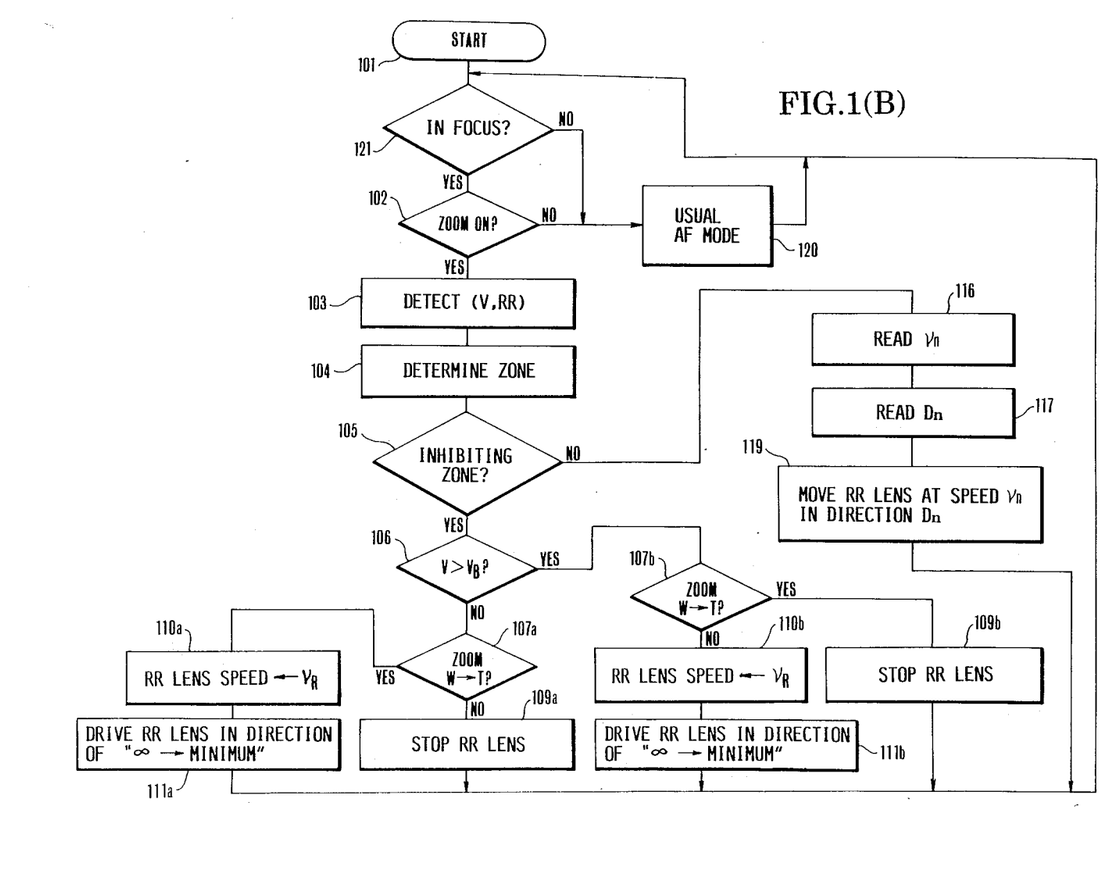
FIG. 1(B) is a flowchart illustrating a first specific embodiment of the invention.

FIG. 1(B) is a flowchart for a procedure of operations of the circuit of the first embodiment of the invention.

In FIG. 1(B), Step 101: Declare an execution of this procedure. Step 102: Discriminate whether or not the camera is in zoom mode. Step 104: From the given positions of the variator lens and the RR lens individually detected in a step 103, which of the zones shown in FIG. 5 the RR lens occupies is determined. Step 105: Test whether or not the determined zone is the inhibiting zone, i.e., impossible-to-focus zone, for the RR lens (that is, whether or not the RR lens lies beyond the terminal end of infinity for focusing movement). Step 106: Determine whether the variator lens lies in the telephoto side or the wide-angle side of a boundary $V_B$ (to be described later). Step 107a, 107b: Determine whether the zooming direction is from the wide-angle side to the telephoto side, or from the telephoto side to the wide-angle side. Step 109a, 109b: Stop the RR lens. Step 110a, 110b: Set the speed of the RR lens to $v_R$. Step 111a, 111b: Move the RR lens in a direction from infinity to the minimum object distance. Step 116: Read a typical speed $v_n$ from the detected zone in the aforesaid step 104. Step 117: Read a direction Dn in which the RR lens is to move from the detected zone in the aforesaid step 104. Step 119: Move the RR lens at the speed $v_n$ in the direction Dn. Step 120: Carry out automatic focusing (AF) as usual when not in the zoom mode. Step 121: Determine whether or not the image is in focus.

In a sequential order, after the electric power source is supplied, the execution begins from the start step 101.

At first, in the step 121, whether or not the image is now in sharp focus is determined based on the output of the AF device 135. If out of focus, then based on the degree of defocus, the step motor 112 is energized to obtain a sharp image in the step 120. The provision of the step 121 is made for the purpose of image-in-focus zooming. If the image has been determined in the step 121 to be in focus, then whether or not the zoom mode is in use is tested in the next step 102. This testing can be performed by examining the output state of the zoom actuation detecting portion 141 shown in FIG. 1(A). Here, if not in the zoom mode, as it implies that the normal mode is in use, the AF operation is carried out through the step 120.

In a case where the camera is determined in the step 102 to be in the zoom mode, the step 103 is executed to detect the positions of the variator lens and the RR lens. Then, to which zone the positional relationship of the lens groups belong is discriminated in the step 104.

Figure 5:
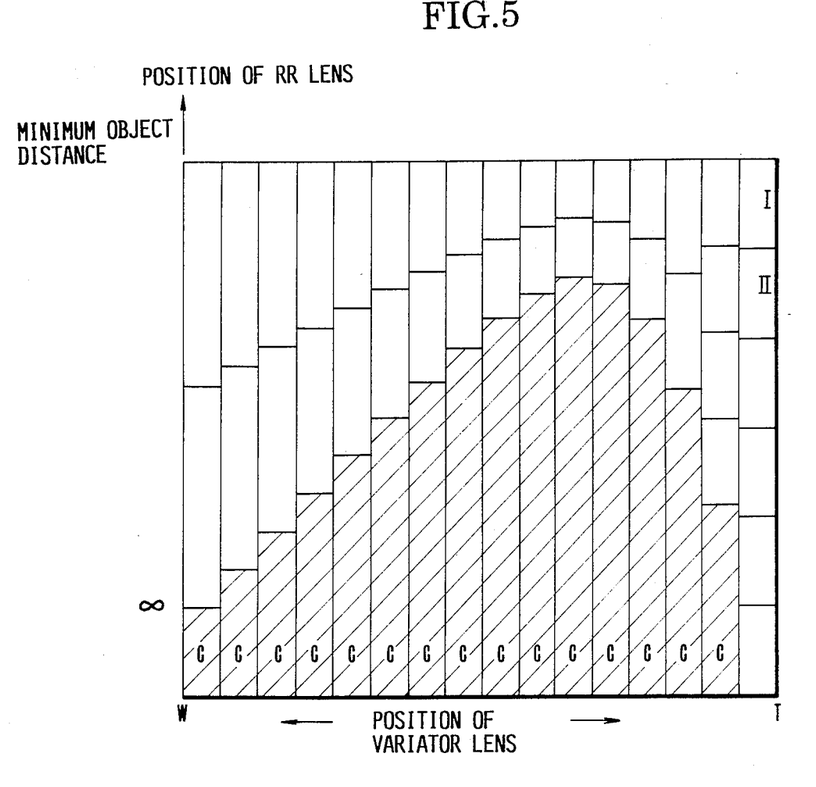
FIG. 5 is a diagram for explaining the division of the range of focusing movement.

Here, an explanation of about FIG. 5 will be provided. This figure represents an idea that the interior of the map shown in FIG. 12 is divided into a plurality of zones on the assumption that the moving speed of the variator lens (abscissa) is constant in each zone, and that the moving speed of the RR lens is determined to differ from zone to zone. This determination is made by reading that information from the zone data memory 133 corresponding to FIG. 5 which is related to the information on the positions of the variator lens and the RR lens. Then, whether or not the zone detected in the step 104 is the inhibiting zone is determined in the step 105. If it is not the inhibiting zone, then the RR lens is moved at the memorized speed for each zone. If the RR lens is determined in the step 105 to lie in the inhibiting zone, then whether the variator lens lies on the telephoto side or the wide-angle side of the boundary $V_B$ is discriminated in the step 106.

Figure 17:
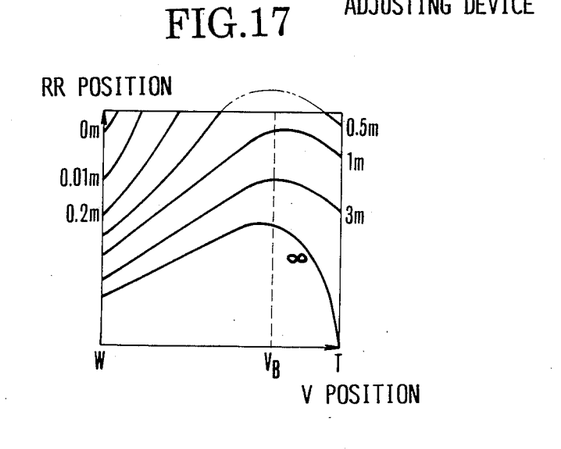
FIG. 17 is a graph for explaining the location of a boundary $V_E$.

FIG. 17 shows the above-described boundary $V_B$ as put on the V-RR curves of FIG. 12. The is, that boundary $V_B$ is defined as passing nearly through the vertex of every V-RR curve.

As the variator lens moves from the wide-angle side to the telephoto side, the RR lens when on the wide-angle side of the boundary $V_B$ moves from infinity to the minimum, or when on the telephoto side of that boundary $V_B$, moves from the minimum to infinity.

Now assuming that the range of movement of the variator lens is divided into 16 parts and they are numbered 0 (zero) to F consecutively from the wide-angle side, then the courses of the steps 106 to 111a, 111b of FIG. 1(B) may be rearranged as follows:

TABLE 1

| Zooming Direction | Variator Lens Position | |
|---|---|---|
|  | $0 \leq V < V_B$ | $V_B < V \leq F$ |
| T → W | Stop RR Lens | Move RR Lens at speed $v_R$ in Direction of "∞ → Minimum" |
| W → T | Move RR lens at speed $v_R$ in Direction of "∞ → Minimum" | Stop RR Lens |

In other words, when the variator lens position V is $0 \leq V < V_B$, if the variator lens is moving in the direction from the telephoto side to the wide-angle side, then the RR lens is caused to stop. This stopping effects a result that as shown in FIG. 5 or FIG. 17, the RR lens apparently moves, describing on the V-RR graph a locus parallel to the V-axis and directed from the telephoto side to the wide-angle side.

Because this apparent movement in the parallel locus to the V-axis continues toward the wide-angle end, even if the RR lens, when in a zooming position near the boundary $V_B$, lies in the inhibiting zone, it can eventually find itself in the focusable zone without failure.

Figure 18:
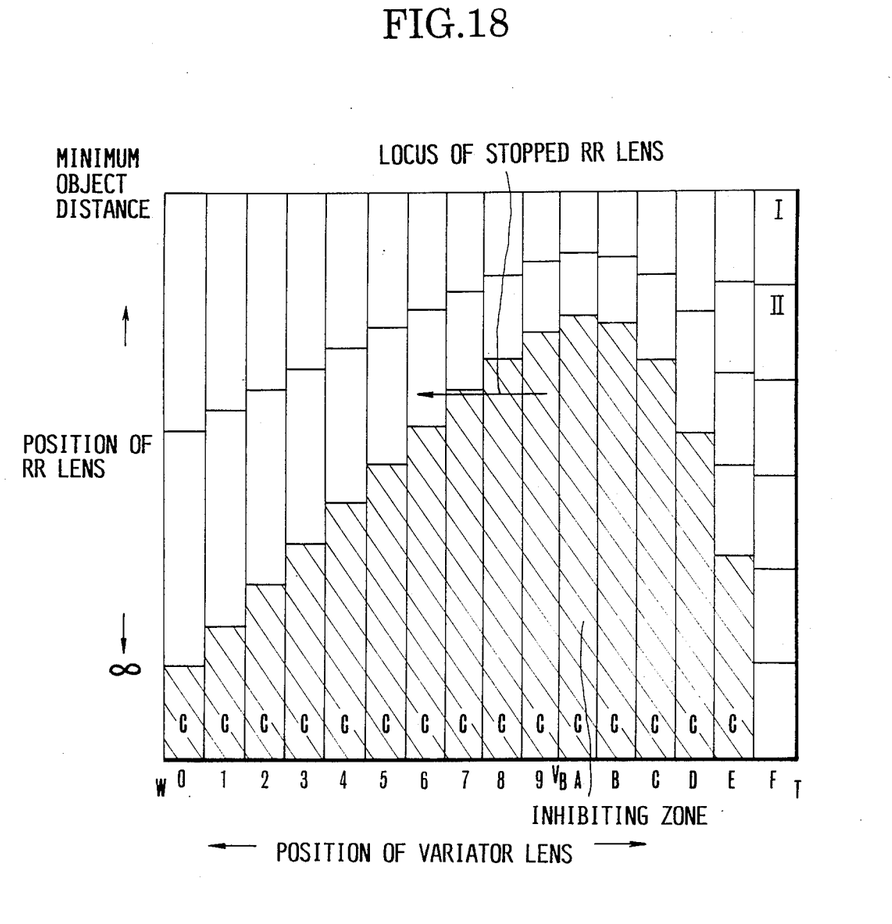
FIG. 18 is a diagram for explaining the relationship of the position of the variator lens and the position of the RR lens.

This behavior is shown in FIG. 18. Incidentally, in Table 1 and FIG. 18, W represents the wide-angle end, and T represents the telephoto end.

Another case is considered wherein similarly, the RR lens falls in the inhibiting zone C and the position V of the variator lens lies in the range of $0 \leq V < V_B$, but the variator lens moves in the opposite direction from the wide-angle end to the telephoto end. If, at this time, the RR lens is stopped, then the RR lens apparently moves deeper and deeper in the inhibiting zone as the V-RR curve approaches the vertex, causing the degree of defocus to increase. To prevent this from occurring, it is under such a condition that, as indicated in Table 1, the RR lens is made to move at the speed $v_R$ in a direction from infinity to the minimum. Thus, the image gets sharper. Here, the speed $v_R$ is set at such a value that the RR lens can return to the focusable zone as fast as possible, while no unduly large stress is given to the operating mechanism. Again, in the range of $V_B < V \leqq F$, the above-described operation is reversed with respect to the moving direction of the variator lens.

Figure 2:
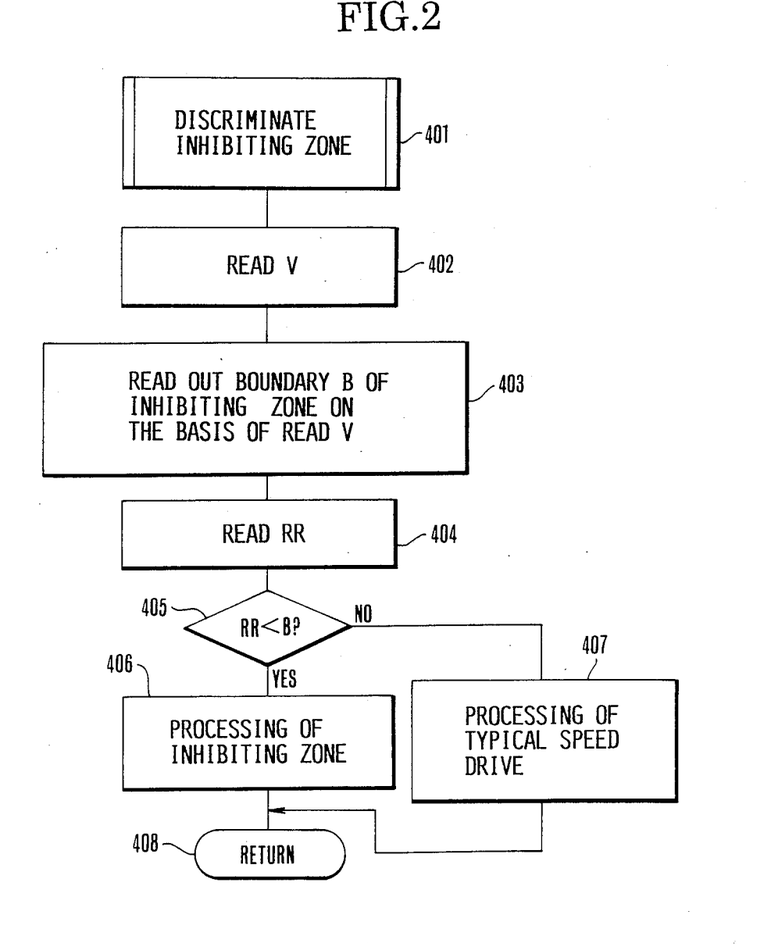
FIG. 2 is a flowchart illustrating a program of part of the program of FIG. 1(B).

By the way, the discrimination of whether or not the inhibiting zone is occupied in the step 105 can be performed by executing the program, for example, shown in FIG. 2.

In FIG. 2, Step 401: Declare an execution of a step of discriminating the inhibiting zone. Step 402: Read the position V of the variator lens detected in the aforesaid step 103. Step 403: Read out the boundary B of the inhibiting zone and the focusable zone in the position of the variator lens read in the step 402 from the zone data memory 133. Step 404: Read the position of the RR lens detected in the aforesaid step 103. Step 405: Compare the aforesaid boundary B with the position of the RR lens in magnitude. Step 406 represents the processing in the steps 106 to 111a, 111b shown in FIG. 1(B), and Step 407 represents the processing in the steps 116 to 119 shown in FIG. 1(B). Step 408: Return to the aforesaid step 121.

When the execution of the discrimination routine of the inhibiting zone is declared, the position V of the variator lens is confirmed in order to read the corresponding boundary B of the inhibiting zone for the V previously stored in the memory 133 in the step 402. Because the RR lens is driven by the step motor 112, and the step motor drive pulse counter 136 is used in detecting the position of the RR lens, the value of the boundary B can be compared directly in the step 405. If the RR lens is determined in the step 405 to fall in the inhibiting zone, then the processing of the inhibiting zone of the step 406 is carried out. Or otherwise, the processing of the typical speed drive of the RR lens is carried out in the step 407.

Figure 3:
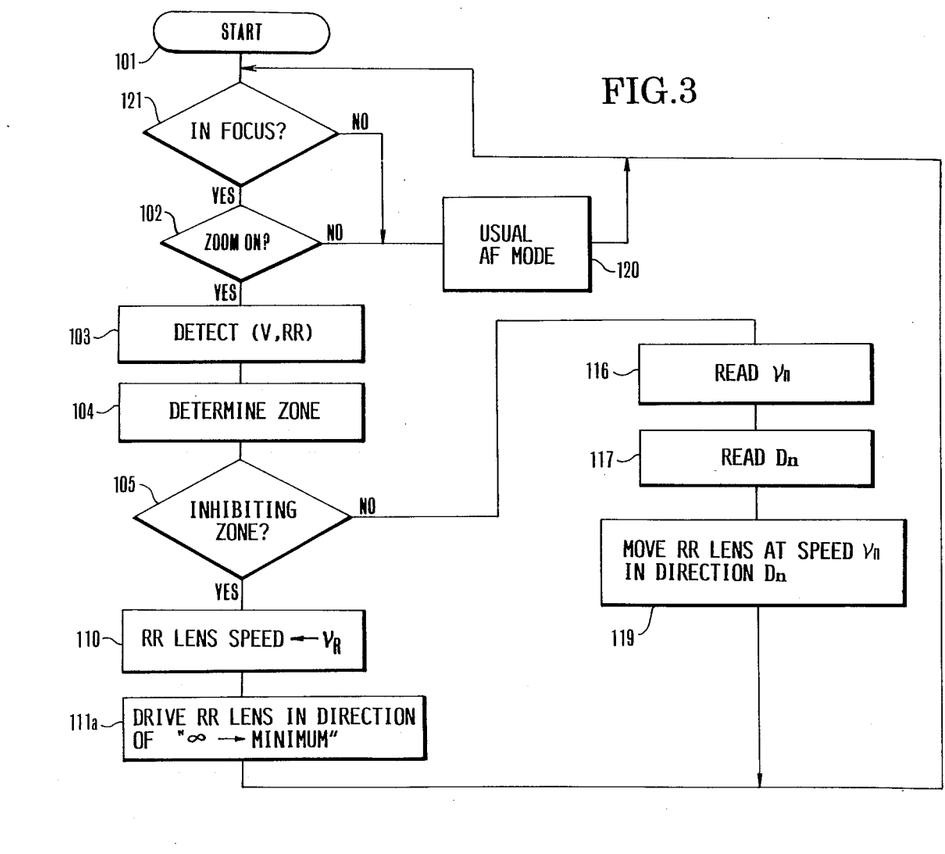
FIG. 3 is a flowchart illustrating a second specific embodiment of the invention.

FIG. 3 is a flowchart of the second embodiment of the invention.

In FIG. 3, the steps having the same functions as those in FIG. 1(B) are labeled with the same numerals.

While, in FIG. 1(B), the movement of the RR lens which has entered the inhibiting zone is changed by the position and the moving direction of the variator lens, this FIG. 3 embodiment is in a simplified form so that when it has entered the inhibiting zone, the RR lens is always driven in the direction of from infinity to the minimum.

That is, in the flowchart of FIG. 1(B), when, as the position of the RR lens has returned to the focusable zone, transition to operation by the usual typical speed has occurred, the direction of movement of the RR lens does not change between before and after the return, or driving from the stopped state takes place. Therefore, even if the speed $v_R$ is increased, an increase of the mechanical load and a delay due to inertia between before and after the return will not appear.

Unlike this, in the FIG. 3 embodiment, there is a case where as soon as the return to the focusable zone occurs, the direction of movement of the RR lens must be reversed. Therefore, this embodiment is suited to application to a lens group of such feature that the relatively small. Incidentally, the step-by-step explanation is omitted herein.

Figure 4:
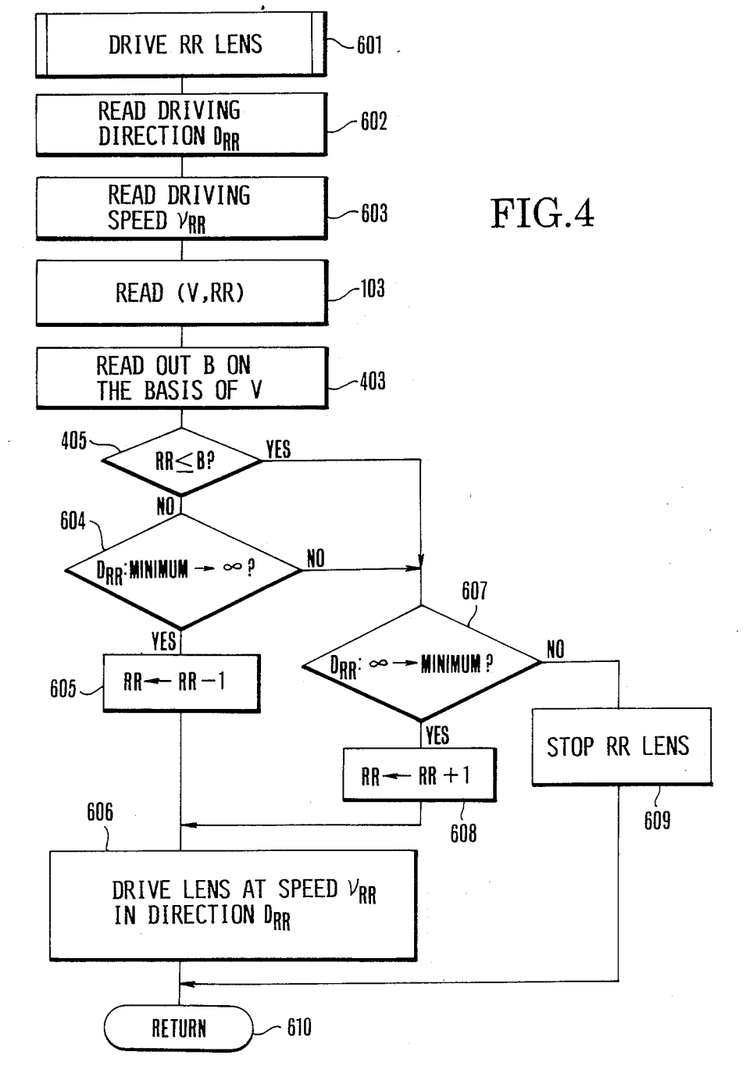
FIG. 4 is a flowchart illustrating a third specific embodiment of the invention.

FIG. 4 is a flowchart of the third embodiment of the invention.

In FIG. 4, the steps having the same functions as those in FIG. 1(B) and FIG. 2 are labeled with the same numerals.

In FIG. 4, Step 601: Declare driving of the RR lens. Step 602: Determine driving direction $D_{RR}$ of the RR lens based on the information from the AF device 135. Step 603: Determine the driving speed $v_{RR}$ of the RR lens from the same. Step 604: Discriminate whether or not the aforesaid direction $D_{RR}$ is from the minimum to infinity. Step 605: Decrement the value of the counter representing the position of the RR lens by one. Step 606: Move the lens at the speed $v_{RR}$ in the aforesaid direction $D_{RR}$. Step 607: Discriminate whether or not the aforesaid direction $D_{RR}$ represents the direction from infinity to the minimum. Step 608: Increment the value of the counter representing the position of the RR lens by one. Step 609: Stop the movement of the RR lens. Step 610: Return to the main step after the execution of the step of driving the RR lens has been completed.

The FIG. 4 flowchart is adapted mainly to a case where the non-zoom mode operates with the AF function and the RR lens is driven by the step motor 112. Also, a series of the step 601 to the step 610 represents a flow such that the pulse change for moving the step motor 112 occurs only once.

That is, when the flow enters the drive routine of the RR lens at the step 601, the direction $D_{RR}$ and the speed $v_{RR}$ which are the drive commands based on the information from the AF device 135 are read in the steps 602 and 603. Then, in the aforesaid step 103, the present positions (V, RR) of the variator lens and the RR lens are individually confirmed. Further, in the step 403, the boundary B of the inhibiting zone for the position V is read from the memory. In the step 405, whether or not the RR lens falls in the inhibiting zone is determined.

In FIG. 4, it is assumed that for RR $\leqq$ B, the RR lens falls in the inhibiting zone. If the execution of the step 405 results in RR $\leqq$ B, then the RR lens is allowed to move only when the direction $D_{RR}$ is from infinity to the minimum in the step 607 in order to prevent the RR lens from further moving rearward to the infinity side. And, in other cases, namely, when the direction $D_{RR}$ is the stop command, or the command from the minimum to infinity, the RR lens is not moved.

In a case where the RR lens is determined in the aforesaid step 405 to lie in the focusable zone, one of the operations: from infinity to the minimum, from the minimum to infinity, and stoppage, is selected in conformance with the direction $D_{RR}$ by the steps 604 and 607. Then the step motor 112 is driven. When the step motor 112 has been driven, the counter 136 is rewritten depending on the direction of movement in the steps 605 and 608. Thus, the next comparison is readied.

FIG. 4 is usable not only in the non-zoom mode, but also in the zoom mode. It should be noted that though in FIG. 4 a stoppage has been used as means for preventing the RR lens from entering deeper into the inhibiting zone, it is also possible to take means for forcibly moving the RR lens in a direction to get further away from the inhibiting zone.

As has been described above, according to the embodiments, the position of the focusing lens is controlled by the control means having such a function that when it has happened that the focusing lens invades the infinity side zone where no image is formed at all owing to the principle of lens design, it is immediately either caused to get out therefrom, or prohibited from further advancing, thereby making it possible that the expansion of the blurring of the image can be prevented without having to add complicated mechanical parts. Moreover, as to the production cost, because of no necessity of adding special parts, an advantage is produced.

Though the foregoing embodiments have been described on the basis of the optical system of FIG. 11, any other types of optical systems may also be used. That is, optical systems such as those called "rear focus" or "inner focus", (specifically speaking, at least part of the lens group movable for focusing includes any lens group except at the axial front end) can be used to employ a similar form of the invention. For example, in application to a modified type of the optical system of FIG. 11 in which when focusing, not only the lens group 16, but also the lens group 1 is moved, the advantages of the invention can be obtained.

What is claimed is:

1. A lens position control device for an optical instrument, comprising:
   (a) a first lens group for performing a function of varying an image magnification by moving along an optical axis;
   (b) a second lens group for performing both a function of compensation at the time of variation of the image magnification and a function of focusing by moving along the optical axis;
   (c) detecting means for detecting a position of said first lens group and a position of said second lens group;
   (d) an electronic memory in which position information of an impossible-to-focus zone of said second lens group based on the position of said first lens group has been stored, said impossible-to-focus zone changing with a change of position of said first lens group; and
   (e) control means for causing said second lens group to retire from said impossible-to-focus zone when said detecting means detects that said second lens group lies in said impossible-to-focus zone on the basis of said position information stored in said memory.

2. A device according to claim 1, wherein said impossible-to-focus zone represents a zone where no in-focus state is obtained in the position of the infinity side of said second lens group.

3. A device according to claim 2, wherein said memory stores a boundary between a possible-to-focus zone of said second lens group and said impossible-to-focus zone on the basis of each position of said first lens group.

4. A device according to claim 2, wherein said detecting means includes a signal forming mechanism for outputting a movement signal in accordance with movement of said first or said second lens group.

5. A device according to claim 2, further comprising a motor for moving at least one of said first lens group and said second lens group in axial directions.

6. A device according to claim 5, wherein said detecting means includes a circuit for detecting the position by counting a driving signal of said motor.

7. A device according to claim 2, wherein said control means causes said second lens group to retire from said impossible-to-focus zone by moving said second lens group toward a minimum object distance side.

8. A device according to claim 2, wherein said control means causes said second lens group to substantially retire from said impossible-to-focus zone by causing said first lens group to move.

9. A device according to claim 2, wherein said control means selectively causes said second lens group to retire from said impossible-to-focus zone by moving said second lens group or causes said second lens group to retire from said impossible-to-focus zone by leaving said second lens group stopped, when said first lens group is being moved to vary the image magnification.

10. A device according to claim 2, wherein said lens position control device is arranged in a photographic lens.

11. A lens position control device for an optical instrument, comprising:
    (a) a first lens group for performing a function of varying an image magnification by moving along an optical axis;
    (b) a second lens group for performing a function of compensation at the time of variation of the image magnification and a function of focusing, by moving along the optical axis;
    (c) detecting means for detecting a position of said first lens group and a position of said second lens group;
    (d) an electronic memory in which position information of an impossible-to-focus zone of said second lens group based on the position of said first lens group has been stored, said impossible-to-focus zone changing with a change of position of said first lens group; and
    (e) control means for prohibiting said second lens group from further moving in a direction toward said impossible-to-focus zone when said detecting means detects that said second lens group lies in said impossible-to-focus zone on the basis of said position information stored in said electronic memory.

12. A device according to claim 11, wherein said impossible-to-focus zone represents a zone where no in-focus state is obtained in the position of the infinity side of said second lens group.

13. A device according to claim 12, wherein said memory stores a boundary between a possible-to-focus zone of said second lens group and said impossible-to-focus zone on the basis of each position of said first lens group.

14. A device according to claim 12, wherein said detecting means includes a signal forming mechanism for outputting a movement signal in accordance with movement of said first or said second lens group.

15. A device according to claim 12, further comprising a motor for moving at least one of said first lens group and said second lens group in axial directions.

16. A device according to claim 15, wherein said detecting means includes a circuit for detecting the position by counting a driving signal of said motor.

17. A device according to claim 12, wherein said control means allows said second lens group to move only in a direction to cause said second lens group to retire from said impossible-to-focus zone.

18. A device according to claim 12, wherein said lens position control device is arranged in a photographic lens.

* * * * *

UNITED STATES PATENT AND TRADEMARK OFFICE
CERTIFICATE OF CORRECTION

PATENT NO. : 4,975,724

DATED : December 4, 1990

INVENTOR(S) : Masahide HIRASAWA, ET AL.

It is certified that error appears in the above-identified patent and that said Letters Patent is hereby corrected as shown below:

COLUMN 1:

Line 19, "to" should be deleted.

COLUMN 2:

Line 20, "which is in such" should be deleted.

COLUMN 3:

Line 40, "distributes" should read --distributed--.

COLUMN 4:

Line 35, "boundary $V_E$." should read --boundary $V_B$.--

COLUMN 6:

Line 16, "that" should be deleted.

UNITED STATES PATENT AND TRADEMARK OFFICE
CERTIFICATE OF CORRECTION

PATENT NO. : 4,975,724

DATED : December 4, 1990

INVENTOR(S) : Masahide HIRASAWA, ET AL.

It is certified that error appears in the above-identified patent and that said Letters Patent is hereby corrected as shown below:

<u>COLUMN 7</u>:

Line 61, "the relatively" should read --the differentiated value of the V-RR curve is relatively--.

Signed and Sealed this

Twenty-third Day of June, 1992

*Attest:*

DOUGLAS B. COMER

*Attesting Officer*   *Acting Commissioner of Patents and Trademarks*